United States Patent

[11] 3,615,670

| [72] | Inventors | Boleslaw Sienkiewicz<br>Pearl River;<br>William J. Meyer, Orangeburg, both of N.Y. |
|---|---|---|
| [21] | Appl. No. | 811,209 |
| [22] | Filed | Mar. 27, 1969 |
| [45] | Patented | Oct. 26, 1971 |
| [73] | Assignee | General Foods Corporation<br>White Plains, N.Y. |

[54] HEATED SURFACE AGGLOMERATION
7 Claims, No Drawings

[52] U.S. Cl. ..................................................... 99/71,
23/313, 99/DIG. 4
[51] Int. Cl. ....................................................... A23f 1/04
[50] Field of Search ........................................... 99/DIG. 4,
71, 199; 23/313

[56] References Cited
UNITED STATES PATENTS

| 3,143,428 | 8/1964 | Reimers et al. ............... | 99/DIG. 4 |
| 3,306,958 | 2/1967 | Gidlow ........................... | 99/DIG. 4 |
| 3,433,644 | 3/1969 | Ganske et al. ................. | 99/DIG. 4 |
| 3,424,589 | 1/1969 | Kaw et al. ...................... | 99/71 |
| 3,471,603 | 10/1969 | Patrick et al. .................. | 23/313 X |
| 3,527,647 | 9/1970 | Hager ............................. | 99/199 |

*Primary Examiner*—Frank W. Lutter
*Assistant Examiner*—William L. Mentlik
*Attorneys*—Gerald E. Jacobs, Bruno P. Struzzi and Thomas V. Sullivan ABSTRACT: A process for agglomeration wherein particles to be agglomerated are wetted and spread onto a solid surface carrier. The carrier is passed over a heated zone in order to raise the temperature of the particles to their fusion point and dry the fused agglomerates. The particles are then carried over a second zone where the temperature of the particles is reduced rapidly to about room temperature. The agglomeration process of this invention eliminates the need for large drying towers and avoids the necessity of costly product pretreatment required in many conventional agglomeration processes.

HEATED SURFACE AGGLOMERATION

BACKGROUND OF THE INVENTION

This invention pertains to a process for agglomerating food particles and the like, in order to achieve uniform readily soluble particles. More particularly, it concerns the utilization of a solid surface which is heated, in lieu of more cumbersome air drying systems.

In all agglomeration processes the particles to be agglomerated are wetted and then caused to contact each other. The wetted particles on contact tend to stick together in clusters, thus forming the agglomerates. The wet agglomerates must then be dried and cooled.

Various means of wetting and contacting the particles to be agglomerated are known in the art. The most common technique involves contacting a flowing stream of particles with steam. After the agglomerates are formed they are usually dried and cooled in an air stream such that the agglomerates are kept separate while they are drying. The most common process utilizes a tower wherein the wet agglomerates fall through the tower and are contacted with warm air which flows cocurrently with the particles. In other processes variations in the air flow have been described wherein the particles are actually maintained in a fluidized bed until they are dried.

The prior art processes generally require rather large equipment in order to handle the large air flows inherently used in the processes. Very often the product to be agglomerated must be pretreated before it can be agglomerated in these air type systems. Pretreatment may include grinding and chilling of the particles to be agglomerated. Often the pretreatment steps are costly and/or difficult to control.

SUMMARY OF THE INVENTION

It has now been discovered that prewetted particles can be spread onto a solid surface carrier, often with no pretreatment prior to wetting, and caused to form into stable agglomerates by moving the particles through a heating zone. The particles are heated to above their fusion temperature and form into agglomerates. The fused agglomerates tend to form into a lightly fused sheet and the particles are dried to a desired moisture by continued exposure in the heating zone. The fused particles are then cooled by passing them through a second zone wherein the temperature of the belt and particles is quickly reduced to about room temperature. The fused material when discharged from the solid surface carrier is passed through a screening operation in order to break up the sheet into particles with a desired size.

In the process of this invention it is unnecessary to use air as a heating or chilling medium. The heating and chilling are readily accomplished by contacting the bottom surface of the carrier with appropriate heat exchange fluids.

As used in this application, solid surface carrier is intended to include any apparatus wherein the particles can be spread out onto a solid surface such that the carrier can be heated and which in turn will transmit heat to the layer of particles. One such apparatus would be a continuous, solid belt. Another would be a rotating drum. The solid surface could be provided by a series of trays which are then conveyed into the heating and cooling zones.

When agglomerating soluble coffee via the prior art processes it has generally been found that in order to form firm agglomerates (i.e., clusters that will not readily break up) soluble coffee must be finely ground prior to agglomeration. By utilizing the process of this invention hard agglomerates were formed using ordinary spray dried coffee as the feed material.

DESCRIPTION OF THE PREFERRED EMBODIMENT

The particles to be agglomerated are prewetted and contacted with one another in order to form the clusters which are to be fused. The prewetting may be accomplished by any of the known techniques in the prior art. Typically this is done by passing the particles through a duct or boxlike enclosure wherein the particles are contacted with steam and the wetted particles collide and stick to each other. When utilizing the process of this invention it is possible to prewet the particles by means which could not be readily used in prior art processes. For example, the particles may be passed through a continuous mixer wherein steam and/or water is introduced to wet the particles. The critical point to be observed in the prewetting step is that the particles should pass through the wetting zone rapidly enough, such that a surface wetting is achieved rather than equilibration of moisture throughout the particles (i.e., absorption of the moisture).

The wetted particles are fed onto a solid surface carrier such that the particles form a sheet or blanket on the belt. The blanket of particles is then conveyed into a heating zone wherein the particle temperature is raised to above its fusion temperature so that the wetted surfaces tend to melt into each other. The temperature is sufficiently high so that fusion is followed by drying and the fused particles are reduced to a desired end moisture content. Typically, in the case of soluble coffee the overall moisture content will be raised to about 4–8 percent by increasing the surface moisture 5 to 15 percent and the fused particles will be dried to a moisture content of about 4.0 percent or less. When utilizing a continuous belt as the solid surface carrier, the heating is accomplished by contacting the lower surface of the belt with steam or a heating liquid.

Instead of using particles with a high surface moisture content as compared to the overall moisture content, the particles may be prewet and allowed to equilibrate before they are spread on the solid surface carrier. Thus, soluble coffee solids with a uniform moisture content of about 8 percent can be spread out on the surface of a continuous belt. The particles are then passed into the heating zone wherein the humidity of the air is maintained sufficiently high to prevent drying while the particles are heated to the fusion temperature. After fusion, the particles may be passed into a less humid heating zone to permit reduction of moisture content to a desired final moisture prior to cooling.

The fused and dried agglomerates are conveyed from the heating zone into a cooling zone. When utilizing a continuous belt, cooling is most readily achieved by circulating tap water or chilled water against the lower surface of the belt. The temperature of the product is easily reduced to less than 90° F.

The cooled blanket of fused material falls readily from the belt at the discharge end and can be broken up into pieces with a desired particle size range by forcing the material through a screen. The resultant agglomerates are found to be granular, strong and very uniform. It has been found that the particles tend to fuse into tight clusters which are only lightly fused together in the sheet or blanket formed on the belt.

If the solid surface carrier is a tray, it can be inverted such that the fused product can be easily discharged. When using a rotating drum, the fused product can be discharged from the drum surface by using a scraper blade.

The process of this invention can be utilized in a manner which will provide a minimum of agglomeration while achieving a desired color change by adjusting the parameters in the wetting and heating zones such that minimum fusion of the product is obtained. When subjecting freeze-dried coffee to such an operation it has been possible to achieve a visibly darker product with a minimum of agglomeration. The conditions are such that the blanket of particles forms only a very lightly contacted sheet of material which readily breaks up into the original particles on subsequent screening.

The process of this invention will now be described by reference to the following specific example:

Spray dried instant coffee at room temperature was fed by means of a vibrating feeder in a stream about 4 inches wide between two perforated pipes. Steam at a pressure of 10–15 p.s.i.g. was fed to the pipes such that the steam issued downward from the perforations at an angle of about 45° from the horizontal. The pipes were set at about 1½ inches apart and parallel to each other such that the streams of steam met at a point midway between the pipes and about 1½ inches below the openings. The system used is very similar to a standard Blaw Knox system.

The steam pipes were enclosed in a box which fit over one end of a Sandvik stainless steel belt such that the pipes were approximately 10 inches above the surface of the belt. The Sandvik belt was 20 inches wide and had a straight run of 12 feet between the drums. The belt was divided into two equal zones. The first zone being used for heating and the second zone being used for cooling. The belt was heated in the first zone to approximately 210° F. by circulating a fluid on the underside of the belt. Cooling was accomplished in the second zone by used chilled water at a temperature of approximately 60° F. The belt speed was 7.5 f.p.m., thus giving a total retention time on the belt of approximately 1.6 minutes.

In the heating zone the agglomerates fused into a semisolid sheet of material and visibly darkened. In the cooling zone the product was easily cooled to less than 85° F. The cooled sheet of product freely discharged from the belt and was passed through a 7 mesh screen. The resultant product was very dark in color, very granular and freely flowing. The bonds of the agglomerated material were found to be very strong and the product did not tend to break apart in subsequent handling.

While this invention has been described by reference to a specific example, reference should be had to the appended claims for a proper definition of its' scope.

What is claimed is:

1. A method for agglomerating water soluble particles comprising wetting the surface of the particles; spreading the wetted particles on a solid-surface carrier to form a blanket of particles; passing the blanket of particles on the carrier through a heating zone, the particle temperature being raised to above the fusion point while maintaining said blanket in a static condition relative to said carrier whereby a blanket of fused particles is formed; further heating said fused blanket to reduce the moisture content to a desired level; passing said fused blanket on the carrier through a cooling zone, the product temperature being reduced to less than 90° F.; and discharging said fused blanket from the carrier through a screen, the blanket being broken into fused particles of a desired size.

2. The method of claim 1 wherein the particles are soluble coffee particles and the surface moisture is sufficient to raise the overall moisture content of the particles to form 4 to 8 percent by weight of the dry solids.

3. The method of claim 1 wherein the particles are prewetted by steam as they fall past a steam nozzle, contacting the wetted particles with one another in order to form clusters, said clusters being spread out on the solid surface carrier.

4. The method of claim 1 wherein the particles are soluble coffee particles.

5. The method of claim 1 wherein the particles are unground spray dried coffee particles.

6. The method of claim 1 wherein the solid surface carrier is a continuous belt.

7. The method of claim 6 wherein heating is accomplished by contacting the lower surface of the belt with a heat exchange fluid.

* * * * *